US008682806B1

(12) United States Patent
Cate et al.

(10) Patent No.: US 8,682,806 B1
(45) Date of Patent: Mar. 25, 2014

(54) COMPUTER BASED JOB APPLICATION VIA SMS MESSAGE OR MOBILE EMAIL

(75) Inventors: Michael S. Cate, Wadsworth, OH (US); Joseph D. Regallis, Northfield, OH (US); Gary Orth, Olmsted Falls, OH (US); Todd Goldstein, Shaker Heights, OH (US); Darragh Caldwell, University Heights, OH (US)

(73) Assignee: Michael S. Cate, Wadsworth, OH (US)

( * ) Notice: Subject to any disclaimer, the term of this patent is extended or adjusted under 35 U.S.C. 154(b) by 946 days.

(21) Appl. No.: 12/619,810

(22) Filed: Nov. 17, 2009

Related U.S. Application Data

(60) Provisional application No. 61/115,581, filed on Nov. 18, 2008.

(51) Int. Cl.
*G06Q 10/10* (2012.01)
*G06Q 10/06* (2012.01)
*G06Q 30/08* (2012.01)

(52) U.S. Cl.
CPC .................................. *G06Q 10/1053* (2013.01)
USPC .............................. 705/321; 705/1.1; 705/320

(58) Field of Classification Search
None
See application file for complete search history.

(56) References Cited

U.S. PATENT DOCUMENTS

| 7,805,382 B2* | 9/2010 | Rosen et al. ................. 705/321 |
| 2002/0007305 A1* | 1/2002 | Fukuda et al. ................. 705/11 |
| 2003/0144862 A1* | 7/2003 | Smith et al. ................. 705/1 |
| 2006/0235884 A1* | 10/2006 | Pfenninger et al. ........ 707/104.1 |
| 2007/0214032 A1* | 9/2007 | Sciuk ................. 705/8 |
| 2007/0244734 A1* | 10/2007 | McGovern et al. ............... 705/7 |
| 2009/0228297 A1* | 9/2009 | McGovern et al. ............... 705/1 |
| 2009/0327013 A1* | 12/2009 | McGovern et al. ............... 705/8 |
| 2011/0166955 A1* | 7/2011 | Sciuk ......................... 705/26.8 |
| 2012/0095933 A1* | 4/2012 | Goldberg ................. 705/321 |

* cited by examiner

*Primary Examiner* — Jonathan Ouellette
(74) *Attorney, Agent, or Firm* — John D. Gugliotta

(57) ABSTRACT

A computer implemented method of effectuating an employment application, comprising: receiving at a computer server system a mobile message (SMS text message) from a job seeker containing an application request comprising of a employment code (employer code, store/location code, or job code) sent by a job seeker mobile device operating independently of the computer server system; merging the job seeker profile data with the employment code and creating an electronic job application for a hiring company that is independent of the computer server system.

20 Claims, 10 Drawing Sheets

Education and Training Edit

High School Graduate Or General Education (GED) Test Passed?

If no, list the highest grade completed

Languages Read, Written or Spoken Fluently Other Than English

College, Business School, Military

| Name and Location | From | To | Semester Hours | Other(Specify) | Graduated | Degree | Year | Major or Subject |
|---|---|---|---|---|---|---|---|---|

Certifications Edit

| Occupational License, Certificate or Registration | Number | Where Issued | Expiration Date |
|---|---|---|---|

Veteran Information Edit

Branch of Service

Date of Entry

Date of Discharge

Special Skills, Interests and Hobbies Edit

Skills

Interests

Hobbies

Work Experience Edit

Privacy Policy | Terms & Conditions | Send Feedback | Company Info
Copyright © 2009 Flexhire, LLC. All rights reserved. 391221-0039 local 2.2.0

Fig. 8b

COMPUTER BASED JOB APPLICATION VIA SMS MESSAGE OR MOBILE EMAIL

RELATED APPLICATIONS

The present application claims the benefit of U.S. Provisional Application 61/115,581 filed 18 Nov. 2008 and incorporated by reference herein as if rewritten in its entirety.

BACKGROUND OF THE INVENTION

1. Technical Field of the Invention

The present invention relates generally to a computer implemented method of effectuating an employment application and, more specifically, to a method for receiving at a computer server system a mobile message (short message system or 'SMS' text message) from a job seeker containing an application request comprising of a employment code (employer code, store/location code, or job code) sent by a job seeker mobile device operating independently of the computer server system.

2. Description of the Background Art

Modern analysis emphasizes that human beings are not "commodities" or "resources", but are creative and social beings in a productive enterprise. As such, for a large or integrated business organization to thrive it is important that the human capital necessary to manage the creative and interactive portions of any enterprise be properly identified, quantified, and obtained. Given the changing business operations that many modern organizations much implement in order to stay successful, it has become increasingly the trend that securing the best quality candidates, at least occasionally if not substantially, relies on external recruitment methods. Rapid changing business models demand skills of experiences which cannot be sourced or developed rapidly enough from the existing employee base that the recruitment process often employs the support of third-party dedicated recruitment firms. This may involve a range of support services, such as: provision of curriculum vitaes or resumes; identifying recruitment media; advertisement design and media placement for job vacancies; candidate response handling; shortlisting; conducting aptitude testing; preliminary interviews; and reference and qualification verification.

Typically, small organizations may not have in-house resources or, in common with larger organizations, may not possess the particular skill-set required to undertake a specific recruitment assignment. Further still, service sector organizations can also rely heavily on entry level, high turnover, season or temporary workers whose skills or functions are, in fact, more of a commodity. Retail, restaurant, seasonal service work ant other sectors where high-volume recruitment in the norm are faced with an unusually large number of recruits at short notice. Further still, many small or independent retail, restaurant or seasonal work providers simply do not have the manpower or resources to hire outside recruiting services, or simply cannot economically afford the cost of procuring the appropriate human capital on a continuous or high turn-over basis.

Such organizations generally rely on any of three time-honored systems: the posting of a 'help wanted' sign at the retail location; the providing of job applications directly to 'walk-in' job applicants; and, personal referrals.

In the recent decades information technology has realized explosive growth. However, the use of such information technology to assist with or automate the process of recruiting new job applicants has yet to evolve to the point where it is actually useful for aiding the employers with retail, restaurant, seasonal service work or in other sectors where high-volume recruitment in the norm are faced with an unusually large number of recruits at short notice in identifying interested recruits with the necessary skill set in an economially efficient manner.

A search of the relevant art indicates that, aside from the equivalent of posting a 'help wanted' sign on electronic databases or social networking sites, little has developed to assist these employees of have entry level, non-career, or high turnover labor positions to fill. Consequently, the need exists to provide a process and system for a computer implemented method of effectuating an employment application and method for receiving an employment application via a mobile message (SMS text message) from a job seeker containing an application request comprising of a employment code (employer code, store/location code, or job code) sent by a job seeker mobile device operating independently of the computer server system. Therefore, unless otherwise indicated herein, the approaches described in this section are not prior art to the claims in this application and are not admitted to be prior art by inclusion in this section.

SUMMARY OF THE INVENTION

1. Technical Problem

It is therefore an object of the present invention to provide an improved method and process of obtaining job applications from prospective employees. A need for such a system exists for employers of have entry level, non-career, or high turnover labor positions to fill to economically use to use social networking sites or SMS text messages to automate the application and screening process.

Currently, a users' only alternative is to employ in-house human resources staff, hire outside recruiting firms or the electronic equivalent (www.careerbuilder.com, www.monster.com, or the like). While this process is effective for career type employment positions, it is very ineffective, costly and time consuming entry level, non-career, or high turnover labor positions.

2. Solution to Problem

The present applicant has implement www.flexhire.com, an online recruiting and hiring tool for part-time and non-career oriented jobs. Flexhire's solution maximizes the effectiveness of companies and organizations that depend heavily on high-turnover positions by re-inventing the process of recruiting and hiring a talented workforce. For the job candidate, the Flexhire Web site is a powerful tool that reduces both the monetary expense and time involved with applying for multiple positions. On the company side, Flexhire optimizes the accessibility of appropriate talent through candidate information standardization and availability status and reducing costs related to human resources administration. Key industry targets include: retail, seasonal products/services companies, consumer banking and hospitality.

The system includes enhanced messaging and text notification as well as Web-based advertising tools, and implements a method for receiving at a computer server system a mobile message (SMS text message) from a job seeker containing an application request comprising of a employment code (employer code, store/location code, or job code) sent by a job seeker mobile device operating independently of the computer server system; merging the job seeker profile data with the employment code and creating an electronic job application for a hiring company that is independent of the computer server system.

This document generally describes systems and methods that may permit an employer to make available through SMS text message a job application, or allow an applicant to automatically forward a pre-filled 'common application' to any such job posting. The application process may occur through the simple composition by the applicant of a text message that includes identifying information for the employer and a position code. The message may then be sent to a mobile messaging application server that forwards it to the hiring company's application(s) server.

The details of one or more embodiments of the invention are set forth in the accompanying drawings and the description below. Other features, objects, and advantages of the invention will be apparent from the description and drawings, and from the claims.

3. Advantageous Effects of Invention

In one aspect of the present invention, a computer-implemented method of effectuating a employment application is provided in which a computer server system receives a text message from a job seeker containing an application. An employment code sent by the job seeker device operates independently of the computer server system. An electronic employment application is created for the hiring company for a position corresponding to the employment code, and the electronic employment application is delivered to a hiring company that is independent of the computer server system.

In some implementations, the text message is in the form of an SMS message.

In yet other aspects, the employment application further comprises information identifying a job seeker.

It yet other aspects, the employment code of the application request is compared to an open employment posting for a hiring company. An employment application is created if the hiring company has open positions, or if a pending application for potential future job postings by the hiring company is anticipated.

In another aspect, the computer-implemented method of effectuating a employment application authenticates identifying information for the job seeker prior to authenticating identifying information for the hiring company based on the information in the employment code In yet other aspects, the text message indicating the employment application for an open position of the third party's hiring posting is transmitted to a device of the third party.

In yet other aspects, the computer-implemented method of effectuating a employment application initiates a SMS message to a mobile device associated with the job seeker requesting secure confirmation of the employment application.

Further still, when a confirmation SMS message is initiated if the employment code is not parseable into a valid employment opportunity, the employment application can be tagged as pending in the case where the job seeker is either not registered in the computer-based recruiting and candidate management system or the job seeker profile does not contain sufficient information to complete the employment application.

In yet another implementation, a computer-implemented method of initiating an employment application transaction is provide for receiving at a computing device an identifier for a job seeker; receiving at the computing device a request to apply for a job posting by a hiring company; and transmitting to a central recruiting and candidate management system a text message containing information reflecting the job seekers identity and the job posting for which the employment application pertains.

In another aspect the transaction entry form is displayed on a display of the computing device in a form having locations for entering the text message hiring company identifier and specific job posting or type of job.

In yet another aspect, a transaction verification text message is received from the central recruiting and candidate management system and displaying all or some of the message specifically the hiring company, hiring company location, and the specific job posting if applicable.

In yet another implementation, a computer-implemented method of effectuating electronic employment application in provide for registering a job seeker with a computer-based recruiting and candidate management system; registering a hiring company with the computer-based recruiting and candidate management system; and causing the transmission of an employment application from the job seeker to the hiring company in response to receipt of an employment application text message.

In another aspect, the employment application text message is received from a device having identifier associated with a profile for the job seeker.

In yet another aspect, the electronic employment application merges the profile or an account of the job seeker and job posting information from the hiring company to create and electronic employment application.

In yet other aspects one or more text messages are sent to the job seeker or the hiring company confirming receipt of the employment application.

In another aspect, the employment text message and the confirming text messages are SMS text messages.

In yet another implementation, a system for managing electronic employment applications is provided in which a text message interface is configured to receive employment application requests from remote text messaging devices. A job seeker, hiring company, and job posting database store information on a user registered with the system and a transaction module electronic communication with the interface and the accounts database is used to match employment requests from a job seeker registered user to a hiring company registered user in response to a text messaged employment application request.

In another aspect the text message interface comprises one or more servers having message parsers to extract employment application commands from received text messages.

In yet another aspect a transaction rules database containing rules that match employment request from job seekers with job postings by hiring companies based on key words algorithm.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 shows a screen shot of a job search function for use therewith;

FIG. 4 shows a screen shot of a TWITTER$^{SM}$ social networking interface function for use therewith;

FIG. 5 shows a screen shot of a FACEBOOK$^{SM}$ social networking interface function for use therewith;

FIG. 8A and FIG. 8B shows a screen shot of a common electronic job application for use with the computer based job application via SMS message or mobile email according to the preferred embodiment of the present invention.

DESCRIPTION OF THE PREFERRED EMBODIMENTS

Figure 1:
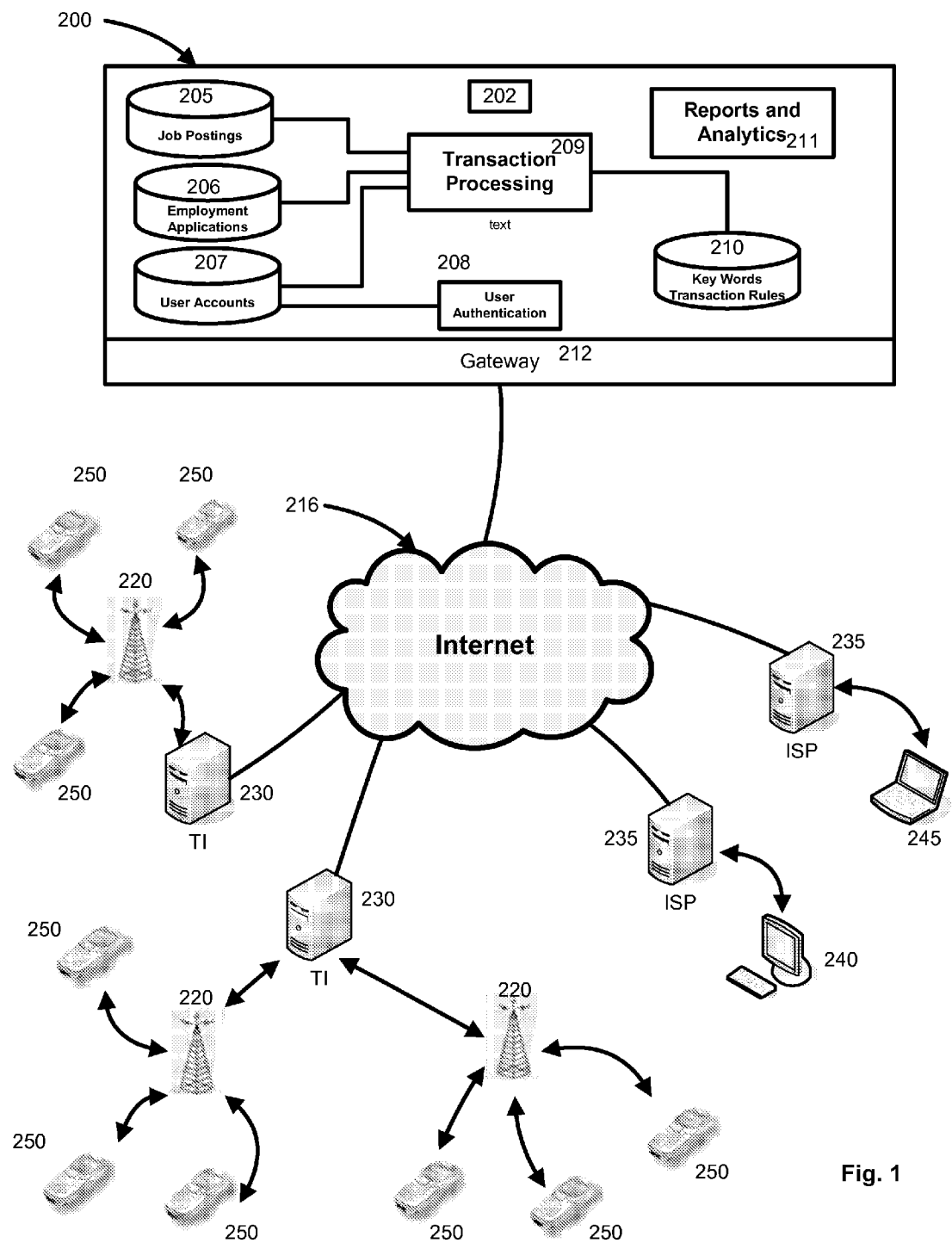
FIG. 1 is a schematic representing a computer based job application via SMS message or mobile email according to the preferred embodiment of the present invention.

Example systems, methods, computer media, and so on are now described with reference to the drawings, where like reference numerals are used to refer to like elements throughout. In the following description, for purposes of explanation, numerous specific details are set forth in order to facilitate thoroughly understanding the methods, systems, computer readable media and so on. It may be evident, however, that the methods, systems and so on can be practiced without these specific details. In other instances, well-known structures and devices are shown in block diagram form in order to simplify description.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

"Computer communications", as used herein, refers to a communication between two or more computer components and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic", as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

"Signal", as used herein, includes but is not limited to one or more electrical or optical signals, analog or digital, one or more computer instructions, a bit or bit stream, or the like.

"Software", as used herein, includes but is not limited to, one or more computer readable and/or executable instructions that cause a computer, computer component and/or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servlet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer/programmer or the like.

An "operable connection" (or a connection by which entities are "operably connected") is one in which signals, physical communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Data store", as used herein, refers to a physical and/or logical entity that can store data. A data store may be, for example, a database, a table, a file, a list, a queue, a heap, and so on. A data store may reside in one logical and/or physical entity and/or may be distributed between two or more logical and/or physical entities.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques. The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

In light of the above, the best mode for carrying out the invention is presented in terms of its preferred embodiment, herein depicted within the Figures.

1. Detailed Description of the Figures

Referring now to FIG. 1, a schematic representing a computer based job application via SMS message or mobile email is shown according to the preferred embodiment of the present invention representative of the overall architecture of the mobile messaging based job application system. In general, this representative system 200 may permit job seekers using electronic devices, such as mobile devices, to submit job applications for job postings posted by hiring company users registered with the system 200.

Communications for carrying out and confirming the job applications may occur in whole or in part via simple means, such as via SMS text messaging. The system 200 based on an application processor 202, which may be comprised of a number of server computers connected to a network such as internet 216. The job application processor 202 may include, for example, web servers, database servers, and related hardware and software to receive and interpret messages for the creation of job applications, verification and posting of the job application, notification of the parties to the transaction, and allowing for various forms of analysis and follow-up.

Application processor 202 receives messages from, and sends messages to, a variety of devices on a number of different networks. For example, mobile devices 250 of various forms may communicate using one or more cellular telephone data networks. The networks may take a typical form, including by communication through towers 220, in communication with various mobile switching centers (telecommunications infrastructure—TI) 230, which may in turn be connected to a central telephone network (not shown) and to the internet 216.

Separately, a hiring company 240 may access the system through an Internet Service Provider 235. Communications with hiring company 240 may be encrypted or otherwise protected for security (as may other communications in the system). Although hiring company 240 is shown connected to the job application processor 202 through the internet (which may be carried out with encryption and other similar features), it may also connect through a private network (not shown) to provide additional security.

Job application processor 202 receives and sends messages through interface 212, which may be comprised of one or more web servers and/or text message servers. Job Application processor 202 may be part of a larger information service provider system that provides services in addition to job application processing, such as search services, mapping, e-commerce, web content delivery, and other on-line services. Thus, interface 212 can be provided with structures for identifying messages relating to job application processing and properly routing such messages or information from such messages. For example, the larger system may accept any sort of SMS text message, and may be provided with a parser to break messages into pieces that can serve as variables for later actions relating to the message. In addition, the parser may obtain information from the text message header.

Information from messages that have been identified as being job application-related messages may be forwarded to an authenticator 208. The authenticator 208 may draw upon a database of user information 207 to check whether information identified in the incoming message is accurate and can be acted upon. By way of example, and not as a limitation, the authenticator may receive an identifier for the sender of the message (e.g., a job seeker) and for the hiring company, such as their SMS identification numbers and job posting number. The authenticator may then search the user information 207 for matches for both users to ensure that they have active accounts with the system.

If the prospective users are validated by the authentication process, the transaction may be passed to a transaction module 209 which is responsible for matching the job seeker, the job posting, the hiring company, creating the job application based on the job seeker application data/profile and for confirming the transaction with the users. Transaction module 209 may draw upon transaction rules 210 in carrying out the transaction. The transaction rules 210 may be general, e.g., specifying that incomplete application data will not allow for an application to be created. The transaction rules 210 may also be user-specific. For example, a hiring company may choose to allow application although there may not be any specific job postings active. In addition, a user or the system may require certain forms of verification for some or all transactions. For example, a user may be willing to be prompted with a password/PIN number (or to provide the Password/PIN number in the initial text message) for all transactions.

Where the transaction module 209 identifies a need for verification, it may pass the verification process to the authenticator 208 or handle the verification itself. Such verification may include, for example, sending a text message that asks for a PIN number, waiting for a response, checking received responses against outstanding requests, and checking the PIN against a stored PIN number for the user.

When prerequisites for a job application transaction have cleared, transaction module 209 will create the job applications and write the transactions to the database in the transactions module 209.

When the job application has been created, the transaction module 209 may then cause confirmatory messages to be sent to the user devices 250. As noted above, such messages may include a text message to the job seeker indicating the job application has been received by the hiring company. The messages may be generated by components in interface 212 such as an SMS server, under control of commands from transaction module 209, and using information passed from or under the control of transaction module 209.

Other modules may be provided with system 202 to provide features described more fully below. For example, analytics module 211 may include one or more applications or routines for analyzing data in system 202. Such analytics information may be made available to users of system 202, to operators of system 202, or to others. For another example, hiring companies may be provided with data about job seekers who have submitted applications—including the numbers of job applications processed, the number of job posting created, and information about job seekers either generically or specifically.

Administrators of system 202 may conduct analyses across larger segments of data in the system. For example, analyses may be conducted to determine the time and locations of job applications so that, for example, the system 202 may be modified to handle higher volumes in certain locales or at certain times. The administrators may also package data for sale to other companies; for example, companies may be interested in on types of job seekers, e.g., to refine marketing messages for reaching out to such users. Raw data may also be passed to third parties to allow them to do their own analyses on the data.

In each circumstance where analysis is conducted on data, the identities of job seekers may be hidden, using any number of well known methods. Whether as part of the analytics information or otherwise, the system 202 may also use a report generator 211 to produce data summaries that are useful to users of system 202, administrators, or third parties. With analytics, a hiring company may be provided with tables and graphs that summarize activity on their account, including number of job postings, numbers of applications submitted, and demographic information regarding the job seekers.

Reports may also be generated aside from particular analytics approaches. For example, a hiring company may use a web browser to access system 202 and receive a chronological listing of transactions for their account. Other such reports may also be provided for users. Reports may include full statistical analysis of the data, including projections into the future based on past transaction volumes.

Where location is tracked (e.g., using location-based services (LBS)), the location may also be considered as a factor for transaction verification. For example, if a job seekers profile information such as home address is significantly different from the location of the job application that is being processed then additional confirmation may be required for the job application.

Location information may be used in other manners, such as by using the location (determined, e.g., by GPS, cell tower triangulation, or short range wireless (e.g., Bluetooth) techniques) to determine available job postings automatically. For example, if geocoded information about multiple open job postings indicates that a user is within a predetermined vicinity of those postings, then the system can notify the job seeker that there are "n" number of job postings within a 10 mile radius of the job seekers location and a list of the top 10 job posting based on comparison with the job seekers user profile and available application data.

Alternatively the syntax of a job application request could simply be "cashier". The system may then determine the best match of available job postings information from the location. Such an approach may make job applications more convenient for the job seeker, and may make job postings for the hiring company equally convenient.

Particular metadata about a transaction may also be obtained and analyzed (either at the time of a transaction or at a later time). Such data may be correlated with other data in the system (e.g., job seeker demographic data, geocoded business information, and hiring company demographic data).

This information may be analyzed as appropriate to provide, for example, directed promotional material, and per-user customization. Such data may also be employed to better serve job seekers and hiring companies in other ways. For example, greater personalization of advertising may be provided. For example, when a user makes an SMS job application at a retail location, the job application information may be used to generate a very specific promotional advertisement such as "a 10% discount is available for purchases made today at the business where you just submitted an application"

Alternatively, data may also be used to provide better matches of job seekers and open employment opportunities. If a job seeker submit's an application for a open job posting for a hiring company a follow up message could be generated that there are 5 other open job postings within a 5 mile radius that match the job seekers profile information.

Figure 2:
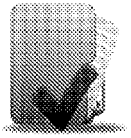
FIG. 2 shows a screen shot of a landing screen for the present invention to allow for online applications to be created, entered or searched.

Referring now to FIG. 2, a screen shot of a landing screen is shown for the present invention to allow for online applications to be created, entered or searched.

Figure 3:
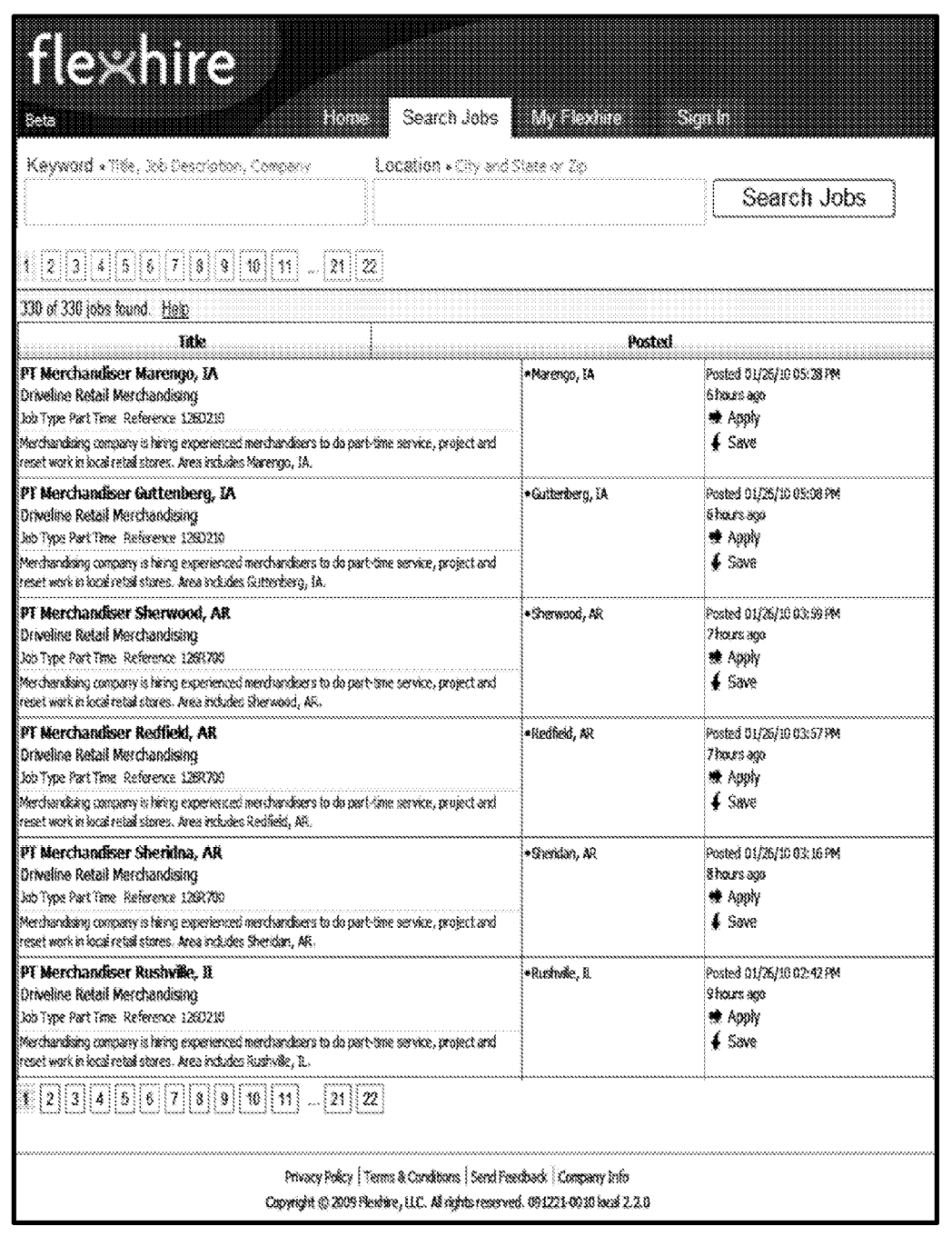

Referring now to FIG. 3A and FIG. 3B, a screen shot of a job search function is shown.

Referring now to FIG. 4A and FIG. 4B, a screen shot of a TWITTER$^{SM}$ social networking interface function is shown.

Figure 5:
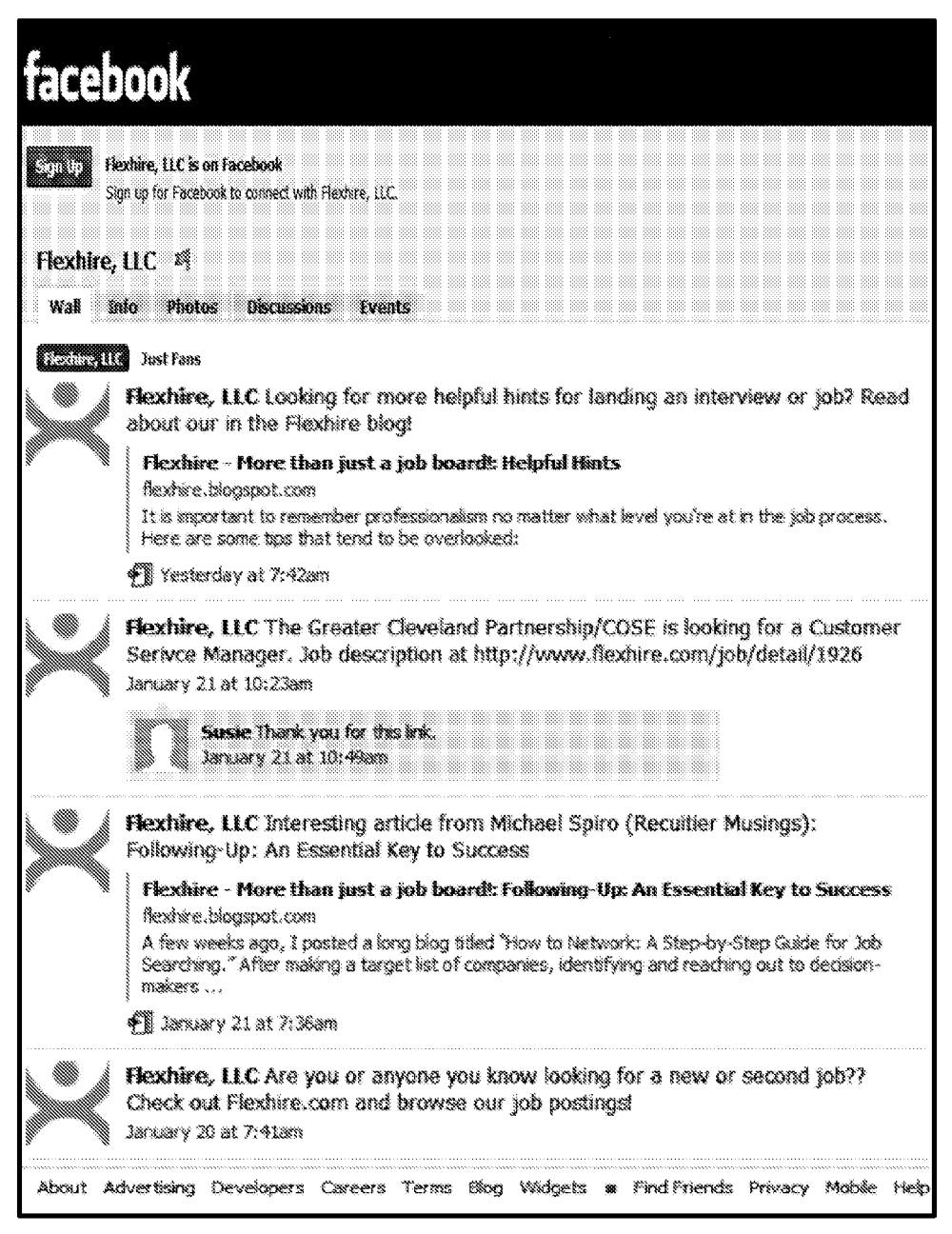

Referring now to FIG. 5A and FIG. 5B, a screen shot of a FACEBOOK$^{SM}$ social networking interface function is shown.

Figure 6:
FIG. 6 shows a screen shot of a LINKEDIN[SM] social networking interface function for use therewith.

Referring now to FIG. 6, a screen shot of a LINKEDIN$^{SM}$ social networking interface function is shown.

Figure 7:
FIG. 7 shows a screen shot of a message access interface for use therewith.

Referring now to FIG. 7, a screen shot of a message access interface is shown.

Figure 8A:
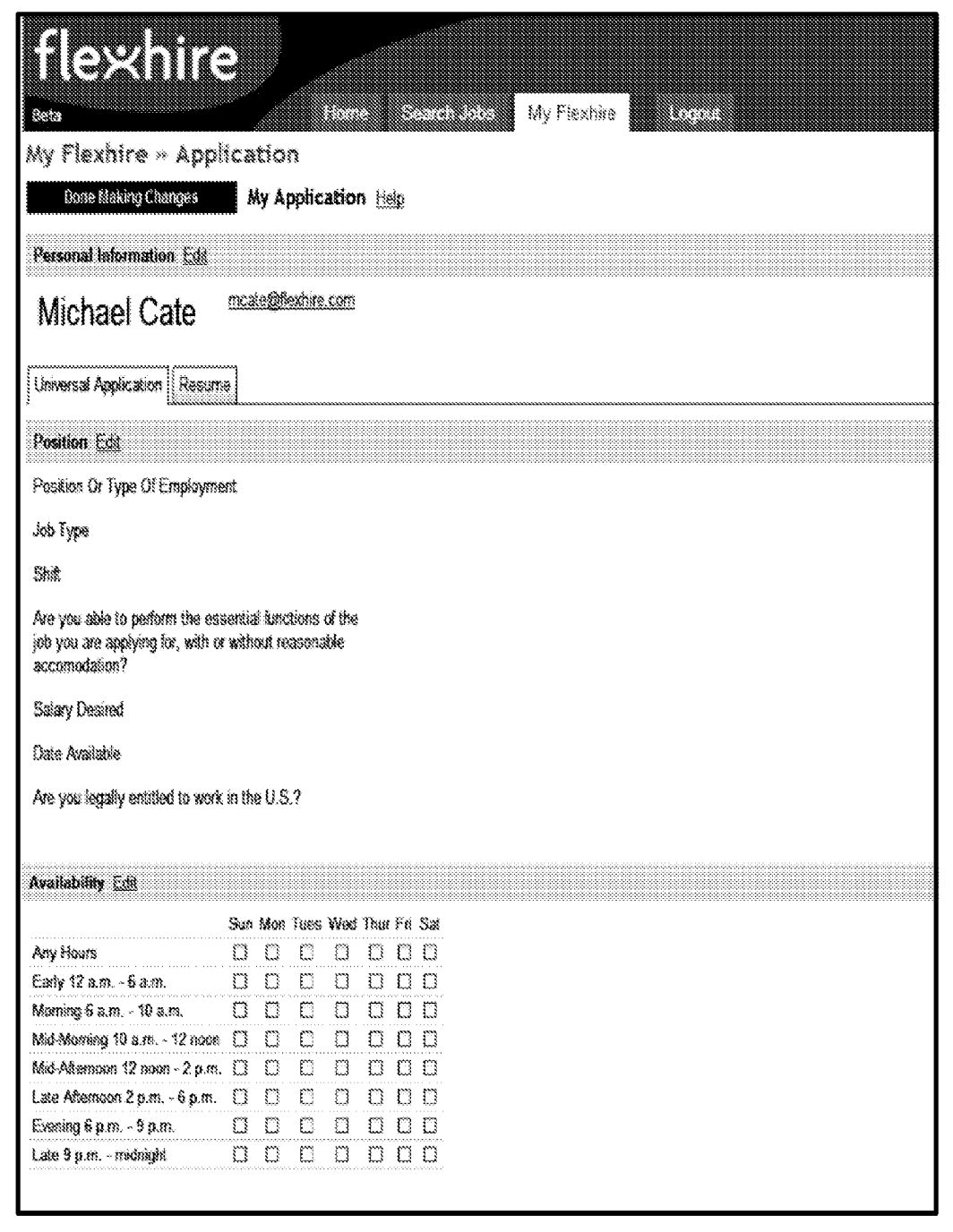

Referring now to FIG. 8A and FIG. 8B, a screen shot of a common electronic job application is shown for use with the computer based job application via SMS message or mobile email according to the preferred embodiment of the present invention.

2. Operation of the Preferred Embodiment

Figure 9:
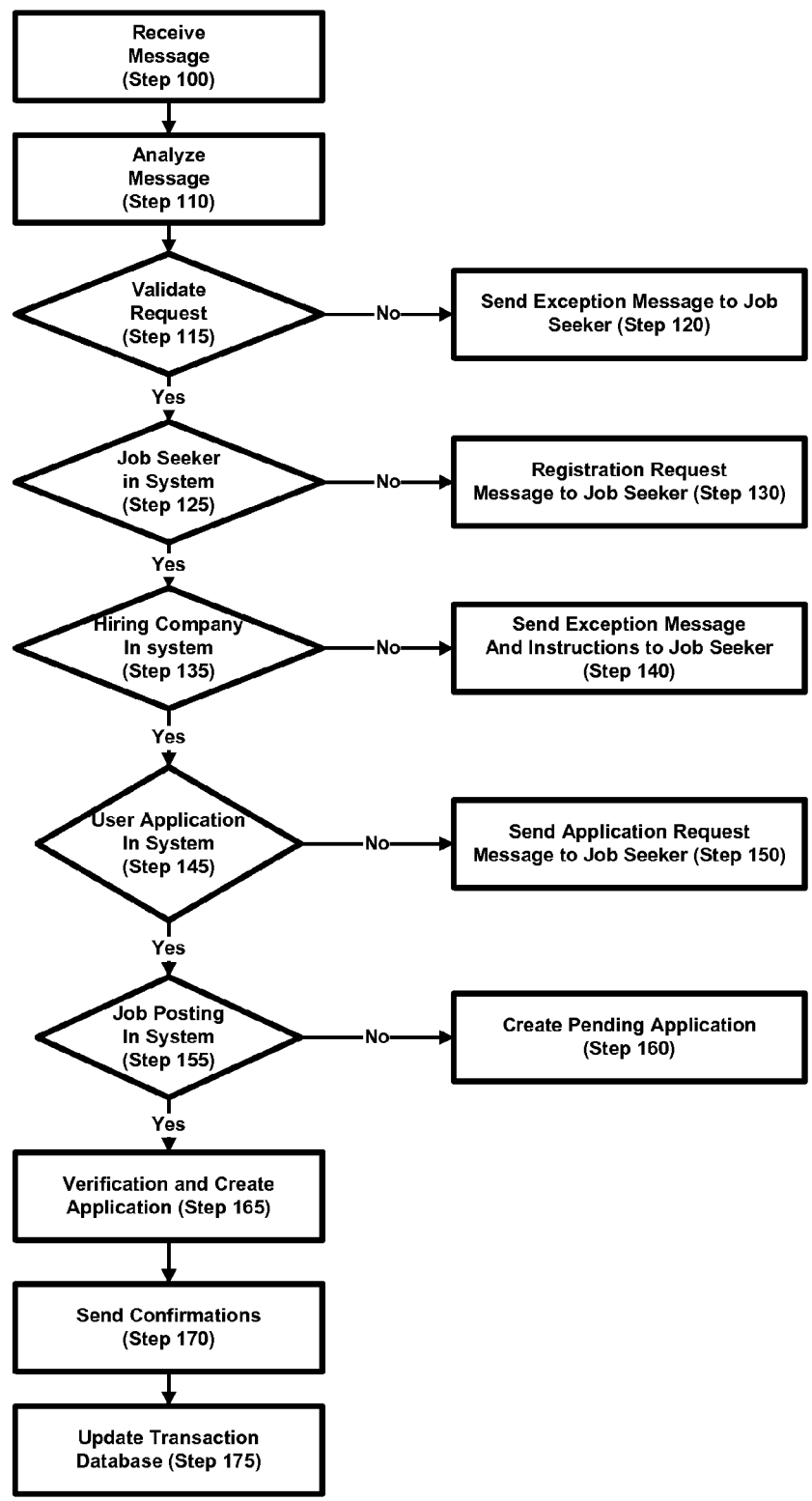
FIG. 9 is a flow diagram of a computer implemented method of effectuating an employment application according to the preferred embodiment of the present invention.

In operation, FIG. 9 outlines the steps and method for an online recruiting and hiring tool for part-time and non-career oriented jobs which provides that maximizes the electiveness of companies and organizations that depend heavily on high-turnover positions by re-inventing the process of recruiting and hiring a talented workforce. This flowchart shows the various process steps in an example job application mobile messaging transaction. This flowchart shows a detailed scenario, including steps that may occur when there are exceptions.

Receive the Message

At step 100, a message is received. The message may be initially received by an SMS server that may classify and route it.

Analyze and Parse the Message

The message is parsed and its fields extracted at step 110. The fields may then be stored in a preformatted data structure for further analysis, and potential transfer for more persistent storage.

Validate Message

If the message is invalid or not a job application request (step 115) an error response (step 120) may be returned to the sender (e.g., using the sender's ID from the original message header as an address). The error message may indicate that the original message was not processed, and may provide instructions showing the proper syntax for a job application request.

Validate Job Seeker

If the query is a valid job application request, the system may then determine whether the job seeker is a registered user of the system (Step 125). This step may involve checking the ID number received with the SMS message against a list of active ID numbers in the system. If the job seeker is not registered in the system, the system may send an error message to the sender (Step 130). Such a message could be formatted as follows: "We couldn't find your profile in our system; sign up today at http://www.flexhire.com." The message could also be formatted as: "You are registered with our system, but your request cannot be processed; please visit http://www.flexhire.com."

Validate Hiring Company

The hiring company may then be checked in the system (Step 135), and if the hiring company does not appear in the system (as determined, for example, by comparing the information in the job code area of the job application request message, to a list of valid and active hiring companies or specific job postings) similar error messages (step 140) may be sent to the job seeker. Alternatively, a generic message may be sent so as not to indicate to the job seeker whether the proposed hiring company is or is not registered with the system.

Validate Job Seeker Application Data

If the message is for a valid job seeker and valid hiring company, the system may check that the job application data retained in the system is sufficient to complete the job application to the hiring company (step 145). If the adequacy of the job application data in the system is not sufficient to complete and submit the job application to the hiring company, the system will send a message (step 150) to the job seeker. Such a message could be formatted as follows: "Your application data is not complete in our system; please visit http://www-.flexhire.com to update your job applications."

Validate Specific Job Posting in the System

After the validation checks for the job seek and the hiring company are complete, as well as the completeness of the job application, the system checks (step 155) whether the data in the message query matches an open job posting in the system or that the hiring company is open for receiving job applications without a specific open job posting. If there is not an open job posting or the company is not accepting applications, then the application will still be created (Step 160), but placed in a pending status. In this case, the system will send a message to the job seeker. Such a message could be formatted as follows: "Your application has been placed in a pending status. The hiring company is not accepting applications at this time; please visit http://www.flexhire.com for updates."

Verification and Create Job Application

Either the job seekers user's account or the hiring company user account may request the system to send a verification request to the job seeker, and not carry out the job application transaction unless the user makes such verification. The verification request may involve an electronic message, such as a text message, that asks the user for a password or PIN. (If the user knows that a request will require such verification, they could also include the password or PIN with the original query, and the system could look for such information before sending a return message to the user asking for verification.) Alternatively, the verification may include a call the user's telephone, followed by a prompt for the user to key or speak a password, PIN, or similar entry. Information from the verification, such as a digital recording of an oral approval by the user, may also be saved by the system for follow-up, e.g., if the transaction is challenged by either the job seeker or hiring company.

When the prerequisites have been checked, the system will create the job application by the job seeker to the hiring company (Step 165).

Confirmation for Job Seeker and Hiring Company

When the job application has been created based on the prerequisite data, the job seeker will be notified by a method previously selected (e.g. text message or email.) The hiring company may be notified (Step 170), as discussed above, or in other appropriate manners.

Log the Transaction

At step 175, information about the transaction is added to a transaction log. Depending on the needs of the particular system, the log may be a database containing information on a transaction-by-transaction basis. Additionally, transaction information may be stored for each of the parties to the transaction e.g. job seeker and hiring company. Linkages from the parties' data may also be provided to a central transaction database. By whatever structure the storage occurs, the logging of transaction information may permit later analysis of transaction data, and the generation of reports for users or for others with access to the system.

For the job candidate, the web site is a powerful tool that reduces both the monetary expense and time involved with applying for multiple positions. On the company side, the site optimizes the accessibility of appropriate talent through candidate information standardization and availability status and reducing costs related to human resources administration. Key industry targets include: retail, seasonal products/services companies, consumer banking and hospitality.

The system includes enhanced messaging and text notification as well as Web-based advertising tools, and implements a method for receiving at a computer server system a mobile message (SMS text message) from a job seeker containing an application request comprising of a employment code (employer code, store/location code, or job code) sent by a job seeker mobile device operating independently of the computer server system; merging the job seeker profile data with the employment code and creating an electronic job application for a hiring company that is independent of the computer server system.

This document generally describes systems and methods that may permit an employer to make available through SMS text message a job application, or allow an applicant to automatically forward a pre-filled 'common application' to any such job posting. The application process may occur through the simple composition by the applicant of a text message that includes identifying information for the employer and a position code. The message may then be sent to a mobile messaging application server that forwards it to the hiring company's application(s) server.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A method of effectuating an employment application, comprising:
   receiving at a computer server system a text message from a job seeker containing a application request comprising an unique employment code sent by a job seeker device operating independently of the computer server system, said employment code corresponding to a particular employer job profile; and
   creating an electronic employment application for a hiring company for a position corresponding to the employment code and delivering the electronic employment application to a hiring company corresponding to said employer job profile;
wherein said electronic employment application is independent of the computer server system.

2. The method of claim 1, wherein the text message is in the form of an SMS message.

3. The method of claim 1, wherein the employment application further comprises information identifying a job seeker.

4. The method of claim 1, further comprising comparing the employment code of the application request to an open employment posting for a hiring company and creating an employment application if the hiring company has open positions else creating a date sensitive pending application for potential future job postings by the hiring company.

5. The method of claim 1, further comprising authenticating identifying information for the job seeker prior to authenticating identifying information for the hiring company based on the information in the employment code.

6. The method of claim 1, further comprising transmitting to a device of the third party a text message indicating the employment application for an open position of the third party's hiring posting has been created.

7. The method of claim 1, further comprising initiating a SMS message to a mobile device associated with the job seeker requesting secure confirmation of the employment application.

8. The method of claim 7, wherein a confirmation SMS message is initiated if the employment code is not parseable into a valid employment opportunity.

9. The method of claim 1, further comprising placing the employment application into a pending status in the case where the job seeker is either not registered in the computer-based recruiting and candidate management system or the job seeker profile does not contain sufficient information to complete the employment application.

10. A computer implemented method of initiating an employment application transaction, comprising:

receiving a SMS or mobile email from a job seeker including a job specific identifier in response to a job posting soliciting the SMS or mobile email, said SMS or mobile email further functioning as an identifier for a job seeker;

creating a request to apply for a job posting by a hiring company for said job seeker; and transmitting to a central recruiting and candidate management system a text message containing information reflecting the job seekers identity and the job posting for which the employment application pertains.

11. The method of claim 10, further comprising displaying a transaction entry form on a display of the computing device, the form having locations for entering the text message hiring company identifier and specific job posting or type of job.

12. The method of claim 11, further comprising receiving a transaction verification text message from the central recruiting and candidate management system and displaying all or some of the message specifically the hiring company, hiring company location, and the specific job posting if applicable.

13. A computer implemented method of effectuating an employment application, comprising:

registering a job seeker with a computer-based recruiting and candidate management system;

registering a hiring company with the computer-based recruiting and candidate management system;

correlating the job seeker with the hiring company; and causing the transmission of an employment application from the job seeker to the hiring company in response to receipt of an employment application text message from the job seeker.

14. The method of claim 13, wherein the employment application text message is received from a device having an identifier associated with a profile for the job seeker.

15. The method of claim 13, wherein the employment application comprises merging the profile or an account of the job seeker and job posting information from the hiring company to create and electronic employment application.

16. The method of claim 13, further comprising a sending one or more text messages to the job seeker or the hiring company confirming receipt of the employment application.

17. The method of claim 14, wherein the employment text message and the confirming text messages are SMS text messages.

18. A system for managing electronic employment applications, comprising:

receiving a text message from a job seeker to a job posting database configured to receive employment application requests from remote text messaging devices;

storing information on a user registered with said job posting database, wherein said information includes said job seeker, a hiring company, and a job posting; and communicating with the job posting database to match employment requests from a job seeker registered user to a hiring company registered user in response to a text messaged employment application request.

19. The system of claim 18, wherein the text message interface comprises one or more servers having message parsers to extract employment application commands from received text messages.

20. The system of claim 18, further comprising a transaction rules database containing rules that match employment request from job seekers with job postings by hiring companies based on key words algorithm.

* * * * *